US005497729A

United States Patent [19]
Lord

[11] Patent Number: 5,497,729
[45] Date of Patent: Mar. 12, 1996

[54] COLLAPSIBLE WHELPING BOX

[76] Inventor: Catherine S. Lord, 1122 Ramapo Valley Rd., Mahwah, N.J. 07430

[21] Appl. No.: 326,195

[22] Filed: Oct. 20, 1994

[51] Int. Cl.$^6$ .................................................. A01K 1/02
[52] U.S. Cl. ............................................................ 119/20
[58] Field of Search .................................. 119/17, 19, 20, 119/165–170, 174, 28.5; 229/168, 178; 220/6, 7, 666, 692

[56] References Cited

U.S. PATENT DOCUMENTS

| | | |
|---|---|---|
| 2,292,540 | 8/1942 | Norton . |
| 2,954,007 | 9/1960 | Mitchell . |
| 3,048,147 | 8/1962 | McKean . |
| 3,195,506 | 7/1965 | Beard . |
| 3,611,994 | 10/1971 | Bailey . |
| 4,484,540 | 11/1984 | Yamamoto . |
| 4,501,226 | 2/1985 | Bienvenu et al. ................... 119/168 |
| 4,548,160 | 10/1985 | Feitelson ................................ 119/168 |
| 4,553,671 | 11/1985 | Cheesman .............................. 206/611 |
| 4,603,658 | 8/1986 | Garnsey . |
| 4,673,087 | 6/1987 | Webb . |
| 4,996,944 | 3/1991 | Zook et al. . |
| 5,121,710 | 6/1992 | Gonzalez . |
| 5,154,137 | 10/1992 | Stanaland ................................. 119/19 |
| 5,287,825 | 2/1994 | Wheeler et al. . |
| 5,311,837 | 5/1994 | Marner-Boellstorff . |
| 5,323,921 | 6/1994 | Olsson . |

Primary Examiner—Thomas Price
Attorney, Agent, or Firm—Samuelson & Jacob

[57] ABSTRACT

A whelping box is constructed of a selectively foldable bottom wall member and a selectively foldable tubular wall member joined together with selectively engaged fastener elements enabling the component parts of the whelping box to be collapsed into a highly compact configuration for shipping and storage in a package having dimensions not exceeding the dimensions prescribed for commercially available economical package delivery systems, while being readily erected for use.

17 Claims, 3 Drawing Sheets

COLLAPSIBLE WHELPING BOX

The present invention relates generally to whelping boxes and pertains, more specifically, to a whelping box having component parts capable of being arranged in a highly compact configuration for shipping and storage and ready erection for use.

Whelping boxes are used by breeders of dogs for assisting during the birth of puppies and for the care of the bitch and the puppies immediately after birth. These whelping boxes provide a comfortable bed for the bitch and include rails extending around the perimeter of the bed to establish a protected space beneath the rails, within which protected space the puppies can migrate to avoid being crushed inadvertently by the bitch, both during the birthing process and afterward.

In general, whelping boxes are large and bulky and are constructed of materials which lend considerable weight to the whelping box. With an increased interest in dog breeding, and especially among amateur breeders who would use a whelping box only infrequently, a need has arisen for a whelping box which can be sold by mail-order methods, as well as in retail stores, and can be delivered readily through mail-order delivery services, as well as being easily carried away by retail customers. Since most available delivery services place limits upon the dimensions and weight of packages which can be delivered economically by such services, and since conventional whelping boxes far exceed those limits, it has not been practical, heretofore, to market whelping boxes on a larger scale, either through mail-order or at retail outlets.

The present invention provides a whelping box which fills the needs outlined above and, as such, attains several objects and advantages, some of which are summarized as follows: Provides a whelping box which is selectively collapsed into a highly compact arrangement for shipping and storage within a package of limited dimensions acceptable for conventional economical delivery services; presents a relatively lightweight packaged whelping box for ease of handling and delivery, as well as for storage; provides a whelping box which is made ready for use with minimal effort and may be maintained clean and sanitary with increased ease; enables the construction of a whelping box which is economical and therefore made available readily for more widespread use; provides a whelping box having a minimum number of relatively simple component parts capable of being erected readily without the need for special tools or special skills, and is dismantled easily for compact storage; provides a rugged construction enabling exemplary performance over an extended service life.

The above objects and advantages, as well as further objects and advantages, are attained by the present invention which may be described briefly as a whelping box having component parts capable of arrangement in a highly compact configuration of prescribed length and width for shipping and storage within a package having dimensions corresponding to said prescribed length and width, and ready erection into an erect configuration having desired dimensions, including height, side-to-side span and front-to-back span, the prescribed length corresponding to said height and the prescribed width corresponding to at least one of said spans, the whelping box comprising: a bottom wall member including bottom panels, the bottom wall member having dimensions corresponding to the said side-to-side span and said front-to-back span when the bottom wall member is in an erect configuration with the bottom panels extending generally side-by-side in a common plane to establish a peripheral edge along the perimeter of the bottom wall member, the peripheral edge having a peripheral edge contour; a hinge between the bottom panels, the hinge having a hinge axis such that the bottom panels are foldable about the hinge axis into juxtaposition with one another to place the bottom wall member into a collapsed configuration; a generally tubular wall member having an upper end and a lower end opposite the upper end, a longitudinal axis extending between the upper end and the lower end, the upper end and the lower end being spaced apart longitudinally a distance corresponding to said height, and wall panels extending essentially parallel to the longitudinal axis between the upper end and the lower end, the wall panels including a front panel, a back panel opposite the front panel, and side panels opposite one another, the front and back panels being spaced apart laterally a distance corresponding to said front-to-back span and the side panels being spaced apart laterally a distance corresponding to said side-to-side span to establish a peripheral edge along the lower end of the tubular wall member, the peripheral edge having a peripheral edge contour matching the peripheral edge contour of the bottom wall member when the tubular wall member is in an erect configuration; further hinges between adjacent panels of the tubular wall member, each further hinge having a longitudinal hinge axis such that corresponding adjacent panels of the tubular wall member are foldable about a corresponding hinge axis into juxtaposition with one another to place the tubular wall member in a collapsed configuration; the front wall panel, the back wall panel and the bottom wall panels each having a length and width not exceeding said prescribed length and width so that the length and width of the bottom wall member in the collapsed configuration and the length and width of the tubular wall member in the collapsed configuration do not exceed said prescribed length and width; selectively attachable and detachable fastener elements for selectively securing the tubular wall member, in the erect configuration, to the bottom wall member in the erect configuration thereof, along the matching peripheral edge contours; at least two rails, each rail having a length and width not exceeding the prescribed length and width of the package, each rail having opposite ends for juxtaposition with opposite panels of the tubular wall member, intermediate the upper and lower ends of the tubular wall member, when the tubular wall member is in the erect configuration; and selectively attachable and detachable further fastener elements for selectively securing the opposite ends of the rails between the juxtaposed opposite panels, intermediate the upper and lower ends of the tubular wall member, when the tubular wall member is in the erect configuration, to lock the tubular wall member in the erect configuration while establishing a protected space between each rail and the erected bottom wall member.

The invention will be understood more fully, while still further objects and advantages will become apparent, in the following detailed description of a preferred embodiment of the invention illustrated in the accompanying drawing, in which.

Figure 1:
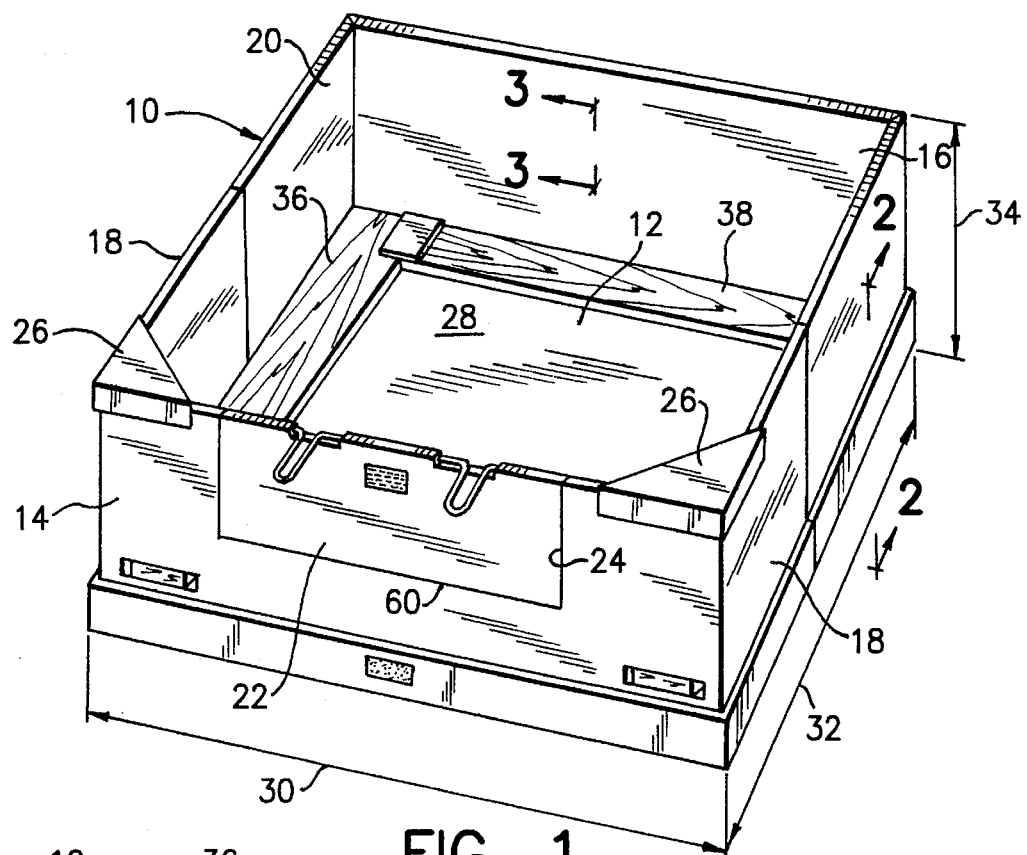
FIG. 1 is a perspective view of a whelping box constructed in accordance with the present invention.

Referring now to the drawing, and especially to FIG. 1 thereof, a whelping box constructed in accordance with the invention is illustrated generally at 10 and is seen to have an open box-like construction including a bottom wall 12, a front wall 14, a back wall 16 opposite the front wall 14, opposite side walls 18, and an open top 20. A door 22 in the front wall 14 selectively opens and closes a door opening 24 in the front wall 14, and corner gussets 26 reinforce the front wall 14 adjacent the opening 24. The walls of the whelping box 10 thus establish a bed 28 within the whelping box 10 for use during and immediately after birthing, as is conventional in the use of whelping boxes.

Whelping box 10 is seen to have a rectangular lateral cross-sectional configuration and includes a side-to-side span 30 and a front-to-back span 32, in this instance the spans 30 and 32 being equal so that the rectangular cross-sectional configuration is illustrated in the form of a square. However, the cross-sectional configuration can be a rectangle in which case the side-to-side span 30, for example, would be greater than the front-to-back span 32. The height 34 of the whelping box 10 preferably is constant around the perimeter of the whelping box 10.

Figure 2:
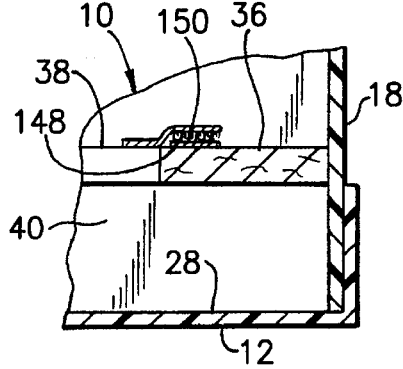
FIG. 2 is an enlarged fragmentary cross-sectional view taken along line 2—2 of FIG. 1.

Puppy rails 36 extend from front wall 14 to back wall 16, along the interior of each side wall 18, and further puppy rails 38 extend between the side walls 18, along the interior of the front wall 14 and the back wall 16, the puppy rails 36 and 38 being spaced upwardly from the bottom wall 12. As best seen in FIG. 2, the location of the puppy rails 36 and 38, spaced upwardly from the bottom wall 12, establishes a protected space 40 between the puppy rails 36, 38 and the bottom wall 12, which protected space 40 is extended around the entire perimeter of the bed 28, as is conventional in whelping boxes, for the protection of new-born puppies from inadvertent crushing by the bitch.

Figure 3:
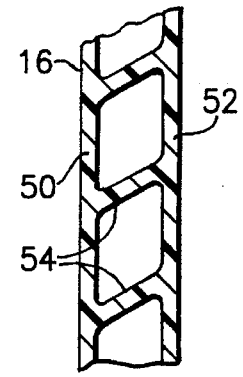
FIG. 3 is an enlarged fragmentary cross-sectional view taken along line 3—3 of FIG. 1.

The walls of whelping box 10, including bottom wall 12, front wall 14, back wall 16 and side walls 18, are constructed of a relatively lightweight material, the preferred material being a hollow-walled synthetic polymeric material, such as a commercially available hollow-walled polypropylene board having an overall thickness of about three-sixteenths to one-quarter inch. As illustrated in FIG. 3, the hollow-walled construction includes an inner layer 50 and an outer layer 52, the inner and outer layers 50 and 52 being interconnected by longitudinal webs 54 spaced laterally from one another to establish a reinforced, hollow panel. The webs 54 are unitary with the layers 50 and 52 so that the entire unitary construction provides a lightweight panel of high strength, well suited for service in whelping box 10. In addition, the smooth outer surfaces of layers 50 and 52 of the material enable ease of cleaning and the ready maintenance of a sanitary environment within the bed 28 and in the vicinity of the whelping box 10.

Figure 4:
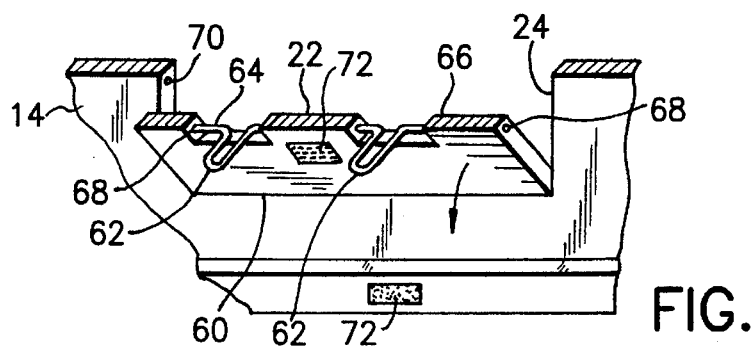
FIG. 4 is a fragmentary perspective view of a portion of the whelping box, with component parts in another operating position.

Door 22 is integral with the front wall 14 and is connected to front wall 14 through a hinge 60 which, in this instance, is a plastic hinge formed within the material of the front wall 14 itself so that the door 22 is unitary with the front wall 14 and can swing forward, as seen in FIG. 4, about a lateral hinge axis provided by hinge 60 to open the opening 24. Latches in the form of wire loops 62 having wire slides 64 are located along the top edge 66 of the door 22 and are mounted for selective lateral sliding movement within passages 68 along the top edge 66 to engage and disengage the wire slides 64 with counterpart passages 70 in the front wall 14, confronting the respective slides 64 and passages 68. When fully open, door 22 is swung through approximately one-hundred-eighty degrees and is secured in the open position by a fastener 72, the preferred fastener 72 being a hook-and-loop fastener such as that available commercially under the trademark VELCRO.

Figure 5:
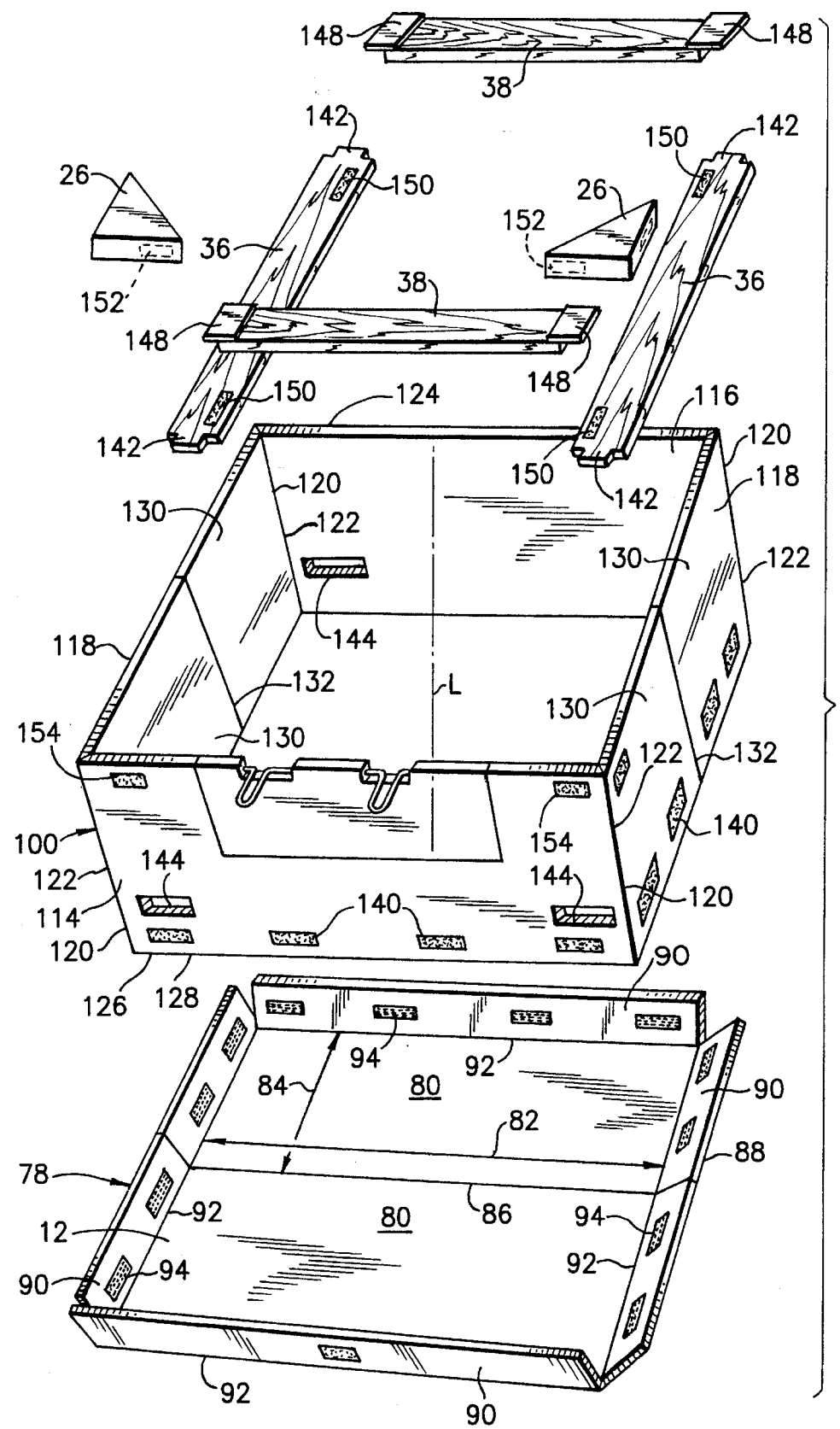
FIG. 5 is an exploded perspective view of the whelping box, showing component parts thereof.

Turning now to FIG. 5, bottom wall 12 is in the form of a bottom wall member 78 including bottom wall panels 80 each having a width 82 corresponding to the side-to-side span 30 of whelping box 10 and a length 84. Bottom wall panels 80 are arranged side-by-side, when the bottom wall member 78 is in the erect configuration illustrated in FIG. 5, and are joined in an integral structure by a hinge 86, preferably in the form a fold line, so that bottom wall member 78 is a unitary structure having a peripheral edge 88. A plurality of flaps 90 are unitary with the bottom wall member 78 around the peripheral edge 88 of the bottom wall member 78, and further fold lines 92 enable the flaps 90 to be moved upwardly, for purposes which will be explained more fully below. A plurality of fastener elements 94 are placed along the flaps 90, the fastener elements 94 being elements of selectively engagable and disengagable fasteners, such as hook-and-loop fasteners available commercially as VELCRO fasteners.

The front wall 14, back wall 16, and side walls 18 are in the form of panels of a unitary tubular wall member 100 in which front panel 114, back panel 116 and side panels 118 are joined in a unitary structure by hinges 120 at the corners 122 formed by the intersection of the panels 114 and 116 with panels 118. Hinges 120 are in the form of fold lines, so that tubular wall member 100 is a unitary construction. Tubular wall member 100 extends longitudinally, parallel to a longitudinal axis L, between an upper end 124 and a lower end 126 and, when in the erect configuration illustrated in FIG. 5, includes a lower peripheral edge 128 having a rectangular peripheral edge configuration. In the erect configuration of tubular wall member 100, the upper end 124 is spaced longitudinally from the lower end 126 a distance corresponding essentially to height 34, the front wall panel 114 is spaced laterally from the back wall panels 116 a distance corresponding essentially to front-to-back span 32, and the side wall panels 118 are spaced apart laterally a distance corresponding essentially to the side-to-side span 30. Side wall panels 118 are divided into sub-panels 130 by further hinges 132, also in the form of fold lines, placed intermediate the corners 122 so as to divide the side wall panels 118 into sub-panels 130 of equal widths. A plurality of fastener elements 140, complementary to fastener elements 94 on the flaps 90 of the bottom wall member 78, are located along the perimeter of the tubular wall member 100, for purposes set forth more fully below.

Puppy rails 36 and 38 preferably are constructed of solid wood. Each puppy rail 36 includes a fastener element in the form of a tab 142 at each end of the puppy rail 36. A complementary fastener element in the form of a slot 144 complementary to a corresponding tab 142 is located in each of the front wall panel 114 and the back wall panel 116. Puppy rails 38 each carry a fastener element 148, preferably of the hook-and-loop type, affixed to each end thereof, and a complementary fastener element 150 is affixed to each puppy rail 36. Complementary fastener elements 152 and 154, again of the hook-and-loop variety, are affixed, respectively, to the corner gussets 26 and the tubular wall member 100.

Figure 6:
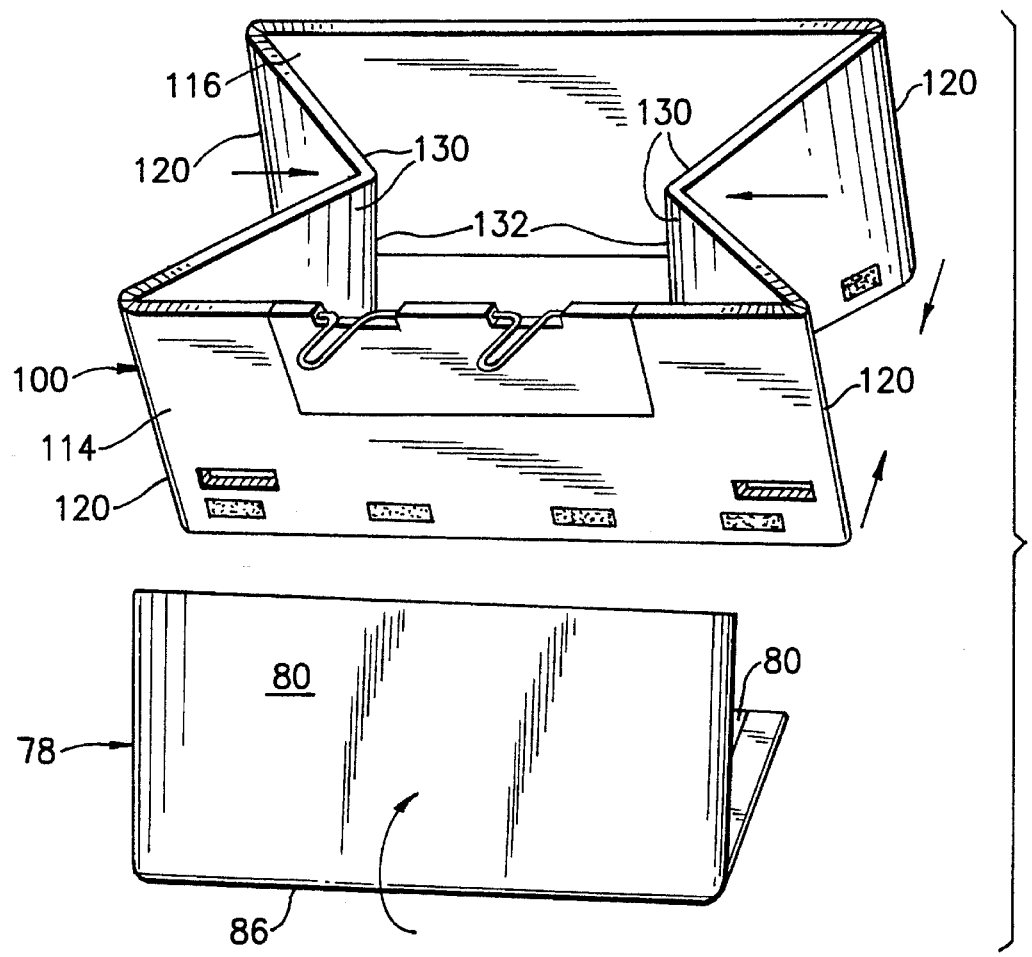
FIG. 6 is an exploded perspective view similar to FIG. 5, but with component parts in another configuration.
Figure 7:
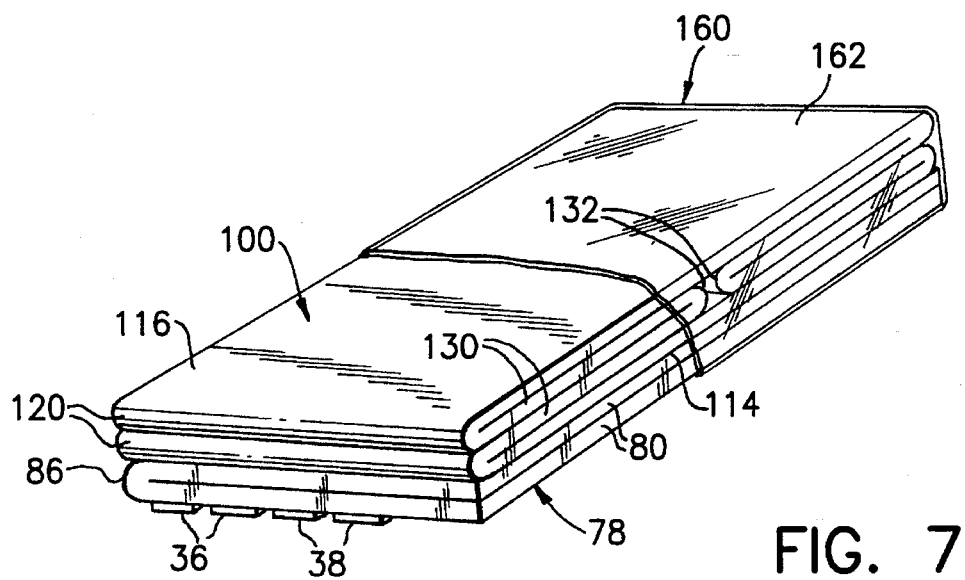
FIG. 7 is a perspective view of the component parts of the whelping box arranged in a compact configuration and placed in a package, for shipment or storage.

Referring now to FIGS. 6 and 7, the component parts of whelping box 10 are capable of arrangement in a highly compact configuration for placement in a package 160 having dimensions suitable for shipping by conventional available economical shipping services. To this end, bottom wall member 78 is folded along hinge 86, as seen in FIG. 6, into a collapsed configuration by folding bottom wall panels 80 about the lateral hinge axis provided by hinge 86 until the bottom wall panels 80 are juxtaposed with one another, as seen in FIG. 7. Tubular wall member 100 is folded into a collapsed configuration by folding the sub-panels 130 about the longitudinal hinge axes provided by further hinges 132 to move the sub-panels 130 inwardly, as seen in FIG. 6, until the sub-panels 130 of each side wall panel 118 are brought into juxtaposition with one another and placed between the juxtaposed front wall panel 114 and back wall panel 116, as shown in FIG. 7. The remaining component parts of the whelping box 10, namely, the puppy rails 36 and 38, and the corner gussets 26, are then stacked with the collapsed bottom wall member 78 and the collapsed tubular wall member 100 and placed in package 160. The package 160 may be closed and sealed, as with a cover 162 of shrink-wrap material. Alternately, the stacked component parts may be fitted within a carton (not shown) to establish the desired package.

It will be seen that the dimensions of package 160 are determined by the length and width of the collapsed bottom wall member 78 and by the length and width of the collapsed tubular wall member 100. By constructing the panels 80 of the bottom wall member 78 and the panels 114, 116, 118 of the tubular wall member 100 with a length and width not exceeding the dimensions acceptable for shipment by conventional economical shipping services, the dimensions of package 160 are maintained acceptable for such shipping. Since the side-to-side span 30 and the height 34 of whelping box 10 can be held within the limits acceptable for the length and width of package 160, the length and width of front wall panel 114 and of back wall panel 116, and the length and width of the bottom wall panels 80, are constructed to be within the prescribed length and width of the package 160, thereby enabling the whelping box 10 to be collapsed into a configuration of acceptable dimensions for shipping in package 160 of acceptable dimensions. Likewise, the length and width of the puppy rails 36 and 38 do not exceed the prescribed length and width of package 160. Typically, whelping box 10 is made available in several sizes having the following dimensions, expressed in terms of inches of side-to-side span 30 by front-to-back span 32 by height 34:

thirty-four by thirty-four by fifteen
forty by forty by twenty
forty-eight by forty-eight by twenty
sixty by forty-eight by twenty-three.

For each of the above-specified sizes, the length and width of the panels 80, 114, 116, and 118 do not exceed the corresponding dimensions acceptable for package 160.

When it is desired to erect whelping box 10, the component parts are removed from the package 160, the bottom wall member 78 is erected by unfolding the bottom wall panels 80 about the hinge 86 until the bottom wall panels 80 lie within the same plane, as seen in FIG. 5. The tubular wall member 100 is erected by unfolding the sub-panels 130 about the further hinges 132 until the side wall panels 118 are planar and are perpendicular to the front wall panel 114 and the back wall panel 116, as illustrated in FIG. 5. When both the bottom wall member 78 and the tubular wall member 100 are in the respective erected configurations, the contour of the peripheral edge 88 of the bottom wall member 78 and the contour of the peripheral edge 128 of the tubular wall member 100 match so that the peripheral edges 88 and 128 may be engaged to establish the bottom wall 12, the front wall 14, the back wall 16 and the side walls 18 of the whelping box 10. Flaps 90 then are moved upwardly to overlap the tubular wall member 100, and the complementary fastener elements 94 and 140 are engaged to secure the bottom wall 12 to the front wall 14, the back wall 16 and the side walls 18, as seen in FIG. 1. The tabs 142 of the puppy rails 36 then are inserted into corresponding slots 144 in the front wall 14 and the back wall 16, and the puppy rails 38 are attached to the puppy rails 36, by means of the fastener elements 148 and 150. It is noted that the puppy rails 36 serve not only to establish the protected space 40, but lock the front wall panel 114 and the back wall panel 116 in place relative to one another while acting as braces between the front wall 14 and the back wall 16 to provide added rigidity to the completed whelping box 10. Likewise, the puppy rails 38 lock the side wall panels 118 in place relative to one another and serve as braces between the side walls 18 to lend added rigidity to the completed structure. Last, the corner gussets 26 are secured at the front corners 122, by means of fasteners 170, in the form of hook-and-loop fasteners, provided along the corresponding upper portions of the tubular wall member 100 and along flaps 172 on the corner gussets 26. The whelping box 10 then is complete, as illustrated in FIG. 1, and has been made ready for use without requiring special tools or special skills.

It will be seen that the above-described construction attains the several objects and advantages summarized above, namely; Provides a whelping box which is selectively collapsed into a highly compact arrangement of component parts for shipping and storage within a package of limited dimensions acceptable for conventional economical delivery services; presents a relatively lightweight packaged whelping box for ease of handling and delivery, as well as for storage; provides a whelping box which is made ready for use with minimal effort and may be maintained clean and sanitary with increased ease; enables the construction of a whelping box which is economical and therefore made available readily for more widespread use; provides a whelping box having a minimum number of relatively simple component parts capable of being erected readily without the need for special tools or special skills, and is dismantled easily for compact storage; provides a rugged construction enabling exemplary performance over an extended service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A whelping box having component parts capable of arrangement in a highly compact configuration of prescribed length and width for shipping and storage within a package having dimensions corresponding to said prescribed length and width, and ready erection into an erect configuration having desired dimensions, including height, side-to-side span and front-to-back span, the prescribed length corresponding to said height and the prescribed width corresponding to at least one of said spans, the whelping box comprising:

a bottom wall member including bottom panels, the bottom wall member having dimensions corresponding to the said side-to-side span and said front-to-back span when the bottom wall member is in an erect configuration with the bottom panels extending generally side-by-side in a common plane to establish a peripheral edge along the perimeter of the bottom wall member, the peripheral edge having a peripheral edge contour;

a hinge between the bottom panels, the hinge having a hinge axis such that the bottom panels are foldable about the hinge axis into juxtaposition with one another to place the bottom wall member into a collapsed configuration;

a generally tubular wall member having an upper end and a lower end opposite the upper end, a longitudinal axis extending between the upper end and the lower end, the upper end and the lower end being spaced apart longitudinally a distance corresponding to said height, and wall panels extending essentially parallel to the longitudinal axis between the upper end and the lower end, the wall panels including a front panel, a back panel opposite the front panel, and side panels opposite one another, the front and back panels being spaced apart laterally a distance corresponding to said front-to-back span and the side panels being spaced apart laterally a distance corresponding to said side-to-side span to establish a peripheral edge along the lower end of the tubular wall member, the peripheral edge of the tubular wall member having a peripheral edge contour matching the peripheral edge contour of the bottom wall member when the tubular wall member is in an erect configuration;

further hinges between adjacent panels of the tubular wall member, each further hinge having a longitudinal hinge axis such that corresponding adjacent panels of the tubular wall member are foldable about a corresponding hinge axis into juxtaposition with one another to place the tubular wall member in a collapsed configuration;

the front wall panel, the back wall panel and the bottom wall panels each having a length and width not exceeding said prescribed length and width so that the length and width of the bottom wall member in the collapsed configuration and the length and width of the tubular wall member in the collapsed configuration do not exceed said prescribed length and width;

selectively attachable and detachable fastener elements for selectively securing the tubular wall member, in the erect configuration, to the bottom wall member in the erect configuration thereof, along the matching peripheral edge contours;

at least two rails, each rail having a length and width not exceeding the prescribed length and width of the package, each rail having opposite ends for juxtaposition with opposite panels of the tubular wall member, intermediate the upper and lower ends of the tubular wall member, when the tubular wall member is in the erect configuration; and selectively attachable and detachable further fastener elements for selectively securing the opposite ends of the rails between the juxtaposed opposite panels, intermediate the upper and lower ends of the tubular wall member, when the tubular wall member is in the erect configuration, to lock the tubular wall member in the erect configuration while establishing a protected space between each rail and the erected bottom wall member.

2. The invention of claim 1 wherein:

the tubular wall member has a generally rectangular lateral cross-sectional configuration including corners located at intersections between each side panel and the front and back panels; and the further hinges are located so that one of said further hinges is placed at each one of the corners, and another of said further hinges is placed in each side panel, intermediate the corners corresponding to the intersection between the side panel and the front and back panels, thereby dividing each side panel into sub-panels, the further hinges joining the wall panels of the tubular wall member in an integral structure;

the further hinges enabling juxtaposition of the front panel with the back panel and folding of the sub-panels inwardly into the tubular wall member into juxtaposition with one another to extend between the juxtaposed front panel and the back panel when the tubular wall member is in the collapsed configuration.

3. The invention of claim 2 wherein the side-to-side span and the front-to-back span each are greater than said height, the width of each panel is greater than the length of the panel, and the sub-panels each have a width which is one-half the width of the corresponding side panel.

4. The invention of claim 2 wherein the two rails extend laterally between the front panel and the back panel, with the ends of each rail adjacent the corresponding one of the front panel and back panel and each rail juxtaposed with one of the opposite side panels when the tubular wall member is in the erect configuration such that the protected space is adjacent each side panel, beneath the corresponding rail.

5. The invention of claim 4 including two further rails each having a length and width not exceeding the prescribed length and width of the package, each further rail having opposite ends for juxtaposition with the side panels, the further rails each being juxtaposed with one of the front panel and the back panel when the tubular wall member is in the erect configuration such that the protected space is extended further, adjacent each of the front panel and the back panel, beneath the corresponding further rails.

6. The invention of claim 5 wherein the bottom wall member includes flaps extending along the peripheral edge of the bottom wall member, the flaps being selectively movable to overlap the tubular wall member at the lower end thereof when the tubular wall member is in the erect configuration, at least some of the fastener elements being carried by the flaps, and other of the fastener elements being carried by the tubular wall member for engagement by said some of the fastener elements to secure together the erect bottom wall member and the erect tubular side wall member.

7. The invention of claim 6 wherein the fastener elements comprise hook-and-loop fasteners.

8. The invention of claim 2 including a door opening in the front panel, a door juxtaposed with the door opening, and a still further hinge connecting the door to the front panel for swinging the door between an open position and a closed position.

9. The invention of claim 8 wherein the still further hinge includes a still further hinge axis extending laterally in a direction between the side panels, and the door swings about the still further hinge axis in directions parallel to the side panels.

10. The invention of claim 9 including a latch for selectively securing the door in the closed position.

11. The invention of claim 2 wherein the panels of the tubular wall member are constructed of a hollow-walled synthetic polymeric material.

12. The invention of claim 11 wherein the panels of the bottom wall member are constructed of a hollow-walled synthetic polymeric material.

13. The invention of claim 2 wherein the tubular wall member is constructed of a unitary member of hollow-walled synthetic polymeric material.

14. The invention of claim 13 wherein the further hinges comprise fold lines in the unitary member.

15. The invention of claim 13 wherein the bottom wall member is constructed of a unitary member of hollow-walled synthetic polymeric material.

16. The invention of claim 15 wherein the hinge in the bottom wall comprises a fold line in the bottom wall member.

17. The invention of claim 13 wherein the synthetic polymeric material is polypropylene.

* * * * *